UNITED STATES PATENT OFFICE.

EMILE MAERTENS, OF PROVIDENCE, RHODE ISLAND.

PROCESS OF CLEANING WOOL.

SPECIFICATION forming part of Letters Patent No. 698,208, dated April 22, 1902.

Application filed February 20, 1901. Serial No. 48,114. (No specimens.)

*To all whom it may concern:*

Be it known that I, EMILE MAERTENS, a citizen of the United States, residing at Providence, in the county of Providence and State of Rhode Island, have invented new and useful Improvements in the Art of Cleaning Wool with Volatile Solvents, of which the following is a specification.

This invention relates more specifically to the use of various aqueous saline or acid solutions (or of both together) in the process of degreasing wool or other animal fibers with a volatile fat-solvent (such as naphtha) for the purpose of preventing or correcting the emulsification of the volatile fat-solvent used in the operation, said solutions being used, first, in moving or displacing the said solvent; second, in removing its residue from the fiber; third, in separating it from other bodies by the process of distillation for its recovery and reuse. Solutions which I find suitable for this purpose may vary greatly in their character, compositions, and chemical action, the utility of some of them for the purpose under consideration depending upon the condition under which they are used, but they can be divided into two classes: (A) saline solutions which can be brought into contact with wool or other animal fibers containing natural soaps or potash compounds without precipitating fatty acids, fat compounds, or soaps insoluble in water on the fiber by the decomposition of the natural soaps or potash compounds present and which will also prevent or correct the emulsification of the volatile fat-solvent present in any part of the apparatus while in contact with it; (B) saline solutions, acid solutions, (or both together,) which will prevent or correct the emulsification of the volatile fat-solvent with which they are in contact, but which should not be brought in contact with the wool or other animal fibers being treated, and especially if they contain any appreciable amount of natural soaps or potash compounds, on account of either their deleterious action on the fiber or by the formation of soaps insoluble in water or the liberation of fatty acids thereon through their chemical action on the natural soaps or potash compounds present. Some of these, however, whose deleterious action is limited to the natural soaps or potash compounds from wool can, if desirable, be brought in contact with the wool or other animal fibers when these do not contain any appreciable amount of soaps or potash compounds.

The solutions of the class A can be used for the three purposes mentioned above and under all conditions, but the solutions of the class B can only be used for moving or displacing the solvent or aid in its stratification or clarification and in the distilling operation to prevent foaming, unless they should have no deleterious effect on the fiber and when the latter contain no appreciable quantity of natural soaps or potash compounds, when they can also be used for all three of the purposes mentioned above.

The operation is carried on in apparatus such as described in United States Patents Nos. 630,293, 630,294, 630,295, 630,296, 654,529, 654,530, 660,757, and 660,758, the essential difference between the processes described therein and the present process consisting in the use, in lieu of water or solutions of potash salts, of aqueous solutions of suitable neutral salts in (*a*) removing from the wool the volatile fat-solvent or the residue of the volatile fat-solvent used in the degreasing operation; in (*b*) moving or displacing from or to the storage-tanks, &c., the volatile fat-solvent used in the degreasing operation and aiding in the stratification and clarification of the same; in (*c*) the distilling operation, and in contact with volatile-fat-solvent solutions or emulsions for the recovery and reuse of the volatile fat-solvent used in the process. It also consists in the use of suitable saline or acid solutions or of both together for the purposes just mentioned under conditions heretofore specified.

Solutions of class A of proper concentration—such as solutions of chlorid of sodium, neutral sulfate of sodium, &c.—may be brought in contact with the volatile fat-solvent in any part of the apparatus and can be passed through the wool immediately after its extraction with volatile fat-solvent, whether it is heavily laden with natural soaps or potash compounds or not and whether the bulk of the volatile fat-solvent remaining upon the fiber has been removed by pressure, gas, or other suitable means or not, and will prevent the emulsification of the mass without liberating on the wool any of the fatty acids of the potash soaps which it contains or without the formation of soaps insoluble in water thereon in contradistinction to the effect of an acid, acid saline, or saline solution which will deleteriously decompose the soaps present.

After the volatile fat-solvent has been removed from the wool by means of a suitable neutral saline solution and after the latter has been drawn off I prefer to rinse the wool with (preferably warm) water before removing it from the extractor.

Suitably concentrated solutions (preferably in conjunction with common salt) of oxalic acid, sulfuric acid, hydrochloric acid, or bisulfate of sodium, and chlorid of calcium, chlorid of barium, &c., are among the suitable acid or saline solutions of the class B which may be used for moving or displacing the volatile fat-solvent or in the distilling of the latter; but they must not be brought in contact with the wool if the latter contains potash soaps in contradistinction to saline solutions having no deleterious decomposing action on the soaps, but which will prevent or correct emulsification and which, as has been stated before, can be used equally well in the removal of the residual volatile fat-solvent from the wool in the displacement of the volatile fat-solvent or in its redistillation or separation.

While it is perfectly true that the clarification of naphtha solutions of wool-fat can be effected by neutral saline solutions, such as a solution of common salt or of Glauber's salt, yet the clarified solution itself when so treated without acid or an acid salt cannot generally be distilled off in a separate vessel by free steam without foaming; but the foam can be completely stopped by the addition of common salt or Glauber's salt to the still. Neutral salts of potassium when added have no such effect in presence of the natural soapy compounds from wool.

The chief trouble with the naphtha solution, whether it be principally an aqueous soap solution or a solvent fatty solution, does not usually appear until the latter end of the process of distillation, and, moreover, if there were no fatty matters present or no soapy matters present but only pure water the distillation of ordinary commercial naphtha therefrom would result in an emulsion at the last stages of the operation, and while this may not be very difficult to distil off, yet the addition of either a neutral salt like common salt or Glauber's salt, or an acid salt like bisulfate of sodium, or a free acid like sulfuric acid, either separately or together, causes a prompt separation of the water from the entangled naphtha, and thus aids in the distillation.

I prefer to use saline solutions of half-saturation and upward and acid solutions of from 1° to 6° Baumé; but I do not wish to limit myself in any way as to their strength, as their suitable strength depends upon the nature and quantity of material to be treated and the length of time or number of times it is desired to use or reuse the solution.

The spent or nearly spent solutions, which have formed useful or valuable products, are drawn off and saved for concentration by evaporation, &c., or other treatment.

Having described my invention, what I claim is—

1. In the art of cleaning wool with volatile fat-solvents the improvement which consists in bringing in contact with the solution or solutions obtained in any part of the apparatus an agent or agents which will prevent or correct the formation of an emulsion with the water present, substantially as described.

2. In the art of cleaning wool with volatile fat-solvents the improvement which consists in treating the solvent on the wool for the purpose of removing the same with an agent or agents which will prevent or correct the formation of an emulsion with any water present and which will not deleteriously decompose the natural soaps of the wool substantially as described.

3. In the art of cleaning wool with volatile fat-solvents the improvement which consists in treating the residual solvent on the wool for the purpose of removing the same with an agent or agents which will prevent or correct the formation of an emulsion with any water present and which will not deleteriously decompose the natural soaps of the wool, substantially as described.

In testimony whereof I affix my signature in presence of two witnesses.

EMILE MAERTENS.

Witnesses:
RUFUS S. MATTESON,
MABEL I. FAY.